United States Patent [19]
Quattlebaum, Jr.

[11] Patent Number: 5,536,308
[45] Date of Patent: Jul. 16, 1996

[54] COMPOSITIONS AND METHODS FOR GLASS COATING FORMATION

[76] Inventor: William M. Quattlebaum, Jr., 5727 Lake Shore Dr., Columbia, S.C. 29206

[21] Appl. No.: 505,010

[22] Filed: Jul. 21, 1995

[51] Int. Cl.⁶ ........................................... C09K 3/00
[52] U.S. Cl. ........................ 106/287.19; 106/125
[58] Field of Search ................ 106/287.19, 1.25; 65/60.52

[56] References Cited

U.S. PATENT DOCUMENTS

| | | | |
|---|---|---|---|
| 4,130,673 | 12/1978 | Larkin | 65/60.2 X |
| 4,144,362 | 3/1979 | Larkin | 65/60.8 X |
| 4,530,857 | 7/1985 | Lindner | 65/60.52 X |
| 4,590,096 | 5/1986 | Lindner | 65/60.52 X |
| 4,721,632 | 1/1988 | Brown | 427/255 X |
| 4,776,870 | 10/1988 | Meyer et al. | 65/60.52 |
| 5,004,490 | 4/1991 | Brown | 65/60.52 |

FOREIGN PATENT DOCUMENTS

| | | | |
|---|---|---|---|
| 0112780 | 7/1984 | United Kingdom | 65/60.52 |

*Primary Examiner*—Helene Klemanski
*Attorney, Agent, or Firm*—Michael A. Mann

[57] ABSTRACT

The above comprises a novel method of inhibiting formation of solids in glass-coating compounds involving use of acids which are soluble in said glass-coating compounds like Butyl Tin Trichloride, and also higher molecular weight acids, preferably Organic Acids like 2-Ethylhexoic Acid which are insoluble in the coating material (preferably Butyl Tin Trichloride), and which float to the surface and act as a water insoluble film to prevent the entrance of water into the Butyl Tin Trichloride and which at the same time prevent the loss of HCI from the Butyl Tin Trichloride.

19 Claims, No Drawings

COMPOSITIONS AND METHODS FOR GLASS COATING FORMATION

SPECIFICATION

Lindner and others have used Alcohols, Esters, Ketones, etc., to retard formation of solids in Butyl Tin Trichloride and other Tin Salts. However, to our knowledge, no one has heretofore used Acids for the specific purpose of retarding the rate of solids formation in salts of tin like Butyl Tin Trichloride, etc.

We have tried the mixture of Methyl and Ethyl Alchols currently in commercial use to retard solids formation, and have found them to be only marginally effective in retarding of solid formation.

Acids, especially Organic Acids, have now been found to be more powerful retardants of solids formation, and are the subject of this application. For example, Butyl Tin Trichloride, stabilized with one percent of 2-Ethylhexoic Acid, when exposed in thin films to moist air, will remain free of solids ten to twenty times as long as the same Butyl Tin Trichloride stabilized with the same amount of the Methanol-Ethanol mixtures claimed by Lindner.

The above increase in resistance to solids formation should be of profound importance in the glass-coating industry, which in presently used formulations is plagued by the plugging of pumps, pipe-lines, etc., as well as by opacities in the glass caused by lumps of such solids.

We offer the following theory as to the mechanism, whereby acids give better performance, but wish our discovery to be in no way limited to this or any particular theory or mechanism.

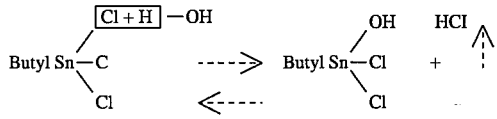

In the thin films always present in containers of Butyl Tin Trichloride, the water in moist air reacts as above with the Butyl Tin Trichloride, yielding HCl. This HCl, being highly volatile, escapes from the mixture, driving the reaction towards the right as would be predicted by the principle of Le Chatelier.

The

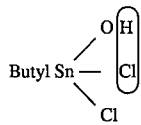

produced, can then lose more HCl driving the reaction further towards the formation of

and similar compounds, which precipitate from the solution.

This may or may not account for solids formation. However, the fact remains that acids have a powerful effect in preventing solids formation, possibly by replacing the volatile HCl with far less volatile 2-Ethylhexoic Acid or other Acid groups, as follows:

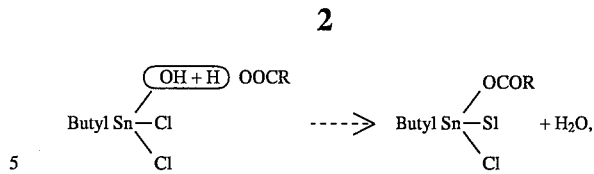

the new product being soluble in the remaining Butyl Tin Trichloride. It is known that other OrganoTin Carboxylates like Dibutyl Tin Dilaurate will dissolve Organontin Oxides and Hydroxides. Thus, with our invention, we have available several ways of preventing precipitation of solids.

While the above would seem the most likely process whereby Acids and Organotin Carboxylates exert such as powerful stabilizing action upon Butyl Tin Trichloride, our invention in no way should be limited to any particular explanation of the effects observed. In summary, regardless of theory, we have found that acids preferably acids of low vapor pressure like 2-Ethylhexoic Acid, are far more effective than the alcohols in commercial use.

Furthermore, Lindler in U.S. Pat. No. 4,530,857 states that "the dopant must be non-reactive with the coating material (Butyl Tin Trichloride, for example).

We have found that dopants which actually react with the coating material prevent precipitation of solids for a much longer time than the non-reactive dopants of the prior art (Methyl and Ethyl Alcohol, for example). The dopant of this invention can be represented by 2-Ethylhexoic Acid and similar Acids. 2-Ethylhexoic Acid and the like react with Alkyl Tin Chlorides, Hydroxides, and Oxides to form the corresponding Carboxlate. A major object of this invention is to disclose than an acid which reacts with an Alkyl Tin Chloride, Hydroxide, or Oxide as an inhibitor of solids formation is superior to the Alcohols, Esters, Ketones of the prior art because they do react with the coating compound. Another advantage of the reactive inhibitor is that the resulting Tin Carboyxlate can dissolve solids formed by the reaction of water with the coating compound.

A glass composition according to a preferred embodiment comprises a tin compound in an amount between approximately 99.8% and 90% by weight, and an acid in an amount between approximately 0.2% and approximately 10%, by weight. The tin compound may include, but is not limited to, the following compounds; tin tetrachloride, butyl-tin triacetate, dibutyl-tin dichloride and dibutyl-tin diacetate. The acid may be an inorganic or an organic acid having a carbon chain of at least six carbons. Some examples of an inorganic acid which can be used include, but are not limited to, phosphoric acid, boric acid, hydrochloric acid and hydrogen bromide.

In addition to the above, we have found the solids formation can be markedly inhibited by the use of a dopant which forms a film on top of the coating material,—oils such as Mineral oil, 2-Ethylhexoic Acid, or other relatively insoluble film forming additives of low vapor pressure.

Where the dopant is soluble, it must react to provide long term stabilization of Butyl Tin Trichloride as noted earlier, or hold HCl or other hydrolysis products in solution (as Acetic Acid holds HCl). Where dopant forms a covering film on the Butyl Tin Trichloride, escape of HCl is repressed. Such a dopant will greatly reduce solids formation caused by reaction of Butyl Tin Trichloride with water.

Examples—Mineral Oil or 2 Ethylhexoic Acid, etc., at 1% or less form a protective layer on top of Butyl Tin Trichloride and thus prevent escape of HCl gas and thus prevent or inhibit formation of solids.

Our most basic discovery is that liquids which prevent the escape of volatile components (like HCl) from coating compound will inhibit or prevent solids formation.

For example, 2-Ethylhexoic Acid will float to the surface of Butyl Tin Trichloride, and prevent, or reduce the amount of $H_2O$ reaching the contained Butyl Tin Trichloride, and at the same time, the surface coating of 2-Ethylhexoic Acid greatly reduces the vapor pressure of the Butyl Tin Trichloride to the point where little of none of it is above the surface to react with the moisture in the air, to give crystals on any surface above the Butyl Tin Trichloride.

Mineral Oil in minute amounts also floats to the surface of Butyl Tin Trichloride, and reduces the amount of moist air which comes in contact with the Butyl Tin Trichloride and also reduces the vapor pressure of the Butyl tin Trichloride.

As a results of these effects, Oils like Mineral Oil, Vegetable Oils, and the like are very effective in preventing solids formation.

CHART 1

Rate of formation of solids in pure Butyl Tin Trichloride using Retardants of the present invention versus rate of formation of solids in pure Butyl Tin Trichloride, and in Atochem TC-100, and in Butyl Tin Trichloride containing 1% of Ethanol as in the Lindner Patent (all tests are in a 100 ml beaker in a draft of moist air).

| | |
|---|---|
| Pure Butyl Tin Trichloride | 30 min. |
| Atochem TC-100 | 30 min. |
| 1% Ethanol in pure Butyl Tin Trichloride | 30 min. |
| 1% 2-Ethylhexoic acid in pure Butyl Tin Trichloride | 5 hours |

What is claimed is:

1. A glass coating composition, comprising:

a Tin Compound known for use in glass coatings; and an oil which forms a protective layer on the surface of the Tin Compound.

2. A composition as recited in claim 1, wherein said oil is in amount of approximately 1%.

3. A composition as recited in claim 1, wherein said oil is a mineral oil.

4. A glass coating composition, comprising:

a Tin Compound known for use in glass coatings, said Tin Compound being present in an amount between approximately 99.8% and approximately 90% by weight; and an inorganic acid in an amount between approximately 0.2% and approximately 10% by weight dissolved in said Tin Compound.

5. A composition as recited in claim 4, wherein said Tin Compound is Tin Tetrachloride.

6. A composition as recited in claim 4, wherein said Tin Compound is an Organo Tin Compound.

7. A composition as recited in claim 4, wherein said Tin Compound is an Organo Tin Compound selected from the group consisting of Butyl-Tin Trichloride, Butyl-Tin Triacetate, Dibutyl-Tin Dichloride and Dibutyl-Tin Diacetate.

8. A composition as recited in claim 4, wherein said Tin Compound is Butyl-Tin Trichloride.

9. A composition as recited in claim 4, wherein said Acid is selected from the group consisting of Phosphoric Acid, Boric Acid, Hydrochloric Acid, and Hydrogen Bromide.

10. A glass coating composition comprising:

a Tin Compound known for use in glass coatings, said Tin Compound being present in an amount between approximately 99.8% and approximately 90% by weight; and an organic acid in an amount between approximately 0.2% and approximately 10% by weight dissolved in said Tin compound, said acid having a carbon chain of at least six carbons.

11. A composition as recited in claim 10, wherein said Tin Compound is Tin Tetrachloride.

12. A composition as recited in claim 10, wherein said Tin Compound is an OrganoTin Compound.

13. A composition as recited in claim 10, wherein said Tin Compound is an Organo Tin Compound selected from the group consisting of Butyl-Tin Trichloride, Butyl-Tin Triacetate, Dibutyl-Tin Dichloride and Dibutyl-Tin Diacetate.

14. A composition as recited in claim 10, wherein said Tin Compound is Butyl-Tin Trichloride.

15. A glass coating composition, comprising:

a Tin Compound known for use in glass coatings, said Tin Compound being present in an amount between approximately 99.8% and approximately 90% by weight; and 2-Ethylhexoic acid in an amount between approximately 0.2% and approximately 10% by weight dissolved in said Tin Compound.

16. A composition as recited in claim 15, wherein said Tin Compound is Tin Tetrachloride.

17. A composition as recited in claim 15, wherein said Tin Compound is an OrganoTin Compound.

18. A composition as recited in claim 15, wherein said Tin Compound is an Organo Tin Compound selected from the group consisting of Butyl-Tin Trichloride, Butyl-Tin Triacetate, Dibutyl-Tin Dichloride and Dibutyl-Tin Diacetate.

19. A composition as recited in claim 15, wherein said Tin Compound is Butyl-Tin Trichloride.

* * * * *